(12) United States Patent
Wright

(10) Patent No.: US 11,305,463 B2
(45) Date of Patent: Apr. 19, 2022

(54) SYSTEM AND METHOD FOR GENERATING NIPPLE PROTOTYPES

(71) Applicant: The Natural Nipple Corp, Tampa, FL (US)

(72) Inventor: Lauren Wright, Tampa, FL (US)

(73) Assignee: The Natural Nipple Corp., Tampa, FL (US)

( * ) Notice: Subject to any disclaimer, the term of this patent is extended or adjusted under 35 U.S.C. 154(b) by 805 days.

(21) Appl. No.: 16/209,975

(22) Filed: Dec. 5, 2018

(65) Prior Publication Data

US 2019/0291307 A1 Sep. 26, 2019

Related U.S. Application Data

(60) Provisional application No. 62/646,481, filed on Mar. 22, 2018.

(51) Int. Cl.
| | |
|---|---|
| *B33Y 50/02* | (2015.01) |
| *B29C 33/38* | (2006.01) |
| *B29C 64/106* | (2017.01) |
| *B29C 33/40* | (2006.01) |
| *B33Y 10/00* | (2015.01) |

(Continued)

(52) U.S. Cl.
CPC ........ *B29C 33/3842* (2013.01); *B29C 33/405* (2013.01); *B29C 64/106* (2017.08); *B33Y 10/00* (2014.12); *B33Y 50/02* (2014.12); *B33Y 80/00* (2014.12); *B29K 2083/00* (2013.01);
(Continued)

(58) Field of Classification Search
CPC .... B22F 10/20; B22F 3/24; B22F 5/00; B22F 5/007; B29C 33/3835; B29C 33/3842; B29C 33/405; B29C 64/106; B29K 2083/00; B29K 2883/00; B29L 2031/7412; B29L 2031/7532; B29L 2031/757; B33Y 10/00; B33Y 40/20; B33Y 50/00; B33Y 50/02; B33Y 80/00; Y02P 10/25
See application file for complete search history.

(56) References Cited

U.S. PATENT DOCUMENTS

| | | | |
|---|---|---|---|
| 2009/0051683 A1* | 2/2009 | Goonetilleke | A43D 1/025 345/419 |
| 2015/0164748 A1* | 6/2015 | Brown | A61J 11/005 215/11.5 |

(Continued)

OTHER PUBLICATIONS

Prime et al. "Comparison of the Patterns of Milk Ejection During Repeated Breast Expression Sessions in Women" from "Breastfeeding Medicine vol. 6, No. 4, 2011" (Year: 2011).*

*Primary Examiner* — Yuhui R Pan
(74) *Attorney, Agent, or Firm* — Chris Tanner; FYPA PLLC

(57) ABSTRACT

A process of 3D scanning lactating women's breasts to generate an AutoCAD model of the maternal nipple is disclosed. The 3D scanning and generation of a plurality of maternal nipple shapes for creation of breastfeeding accessories and molds is intended to closely mimic a specific mother's unique nipple shape, which can vary widely from one woman to another. The embodiments eliminate nipple confusion in infants being introduced to a bottle nipple and pacifier, in order to promote prolonged breastfeeding. Mimicking a mother's unique nipple shape helps create accessories that better fit a mother's unique nipple size and shape and decrease pain (i.e. pump flange and nipple shield).

14 Claims, 16 Drawing Sheets

(51) Int. Cl.
  *B33Y 80/00* (2015.01)
  *B29L 31/00* (2006.01)
  *B29K 83/00* (2006.01)

(52) U.S. Cl.
  CPC ... *B29K 2883/00* (2013.01); *B29L 2031/7412* (2013.01); *B29L 2031/757* (2013.01)

(56) References Cited

U.S. PATENT DOCUMENTS

2017/0272728 A1* 9/2017 Rafii .................. H04N 13/239
2017/0274196 A1* 9/2017 Nordon .................. B29C 33/40
2017/0312184 A1* 11/2017 Lofaro ................ B29C 33/3842

* cited by examiner

FIG. 2 (measurement arrangement)

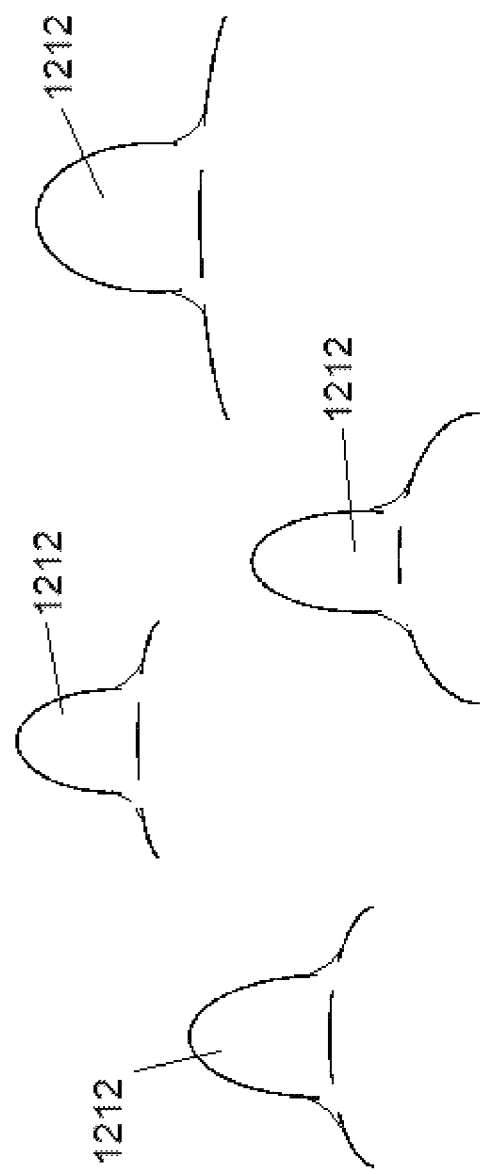

```
┌─────────────────────────────────────────────────┐
│ secure lactating mother's breast to the pump flange 1404 │
│ at a 45 degree angle from horizontal;           │
└─────────────────────────────────────────────────┘
                         ⇩
┌─────────────────────────────────────────────────┐
│ set the timer 1412;                             │
└─────────────────────────────────────────────────┘
                         ⇩
┌─────────────────────────────────────────────────┐
│ setting the negative pressure setting on the breast pump │
│ 1408 from 0-450 mm/hg;                          │
└─────────────────────────────────────────────────┘
                         ⇩
┌─────────────────────────────────────────────────┐
│ pump the breastmilk into the storage vessel 1416 │
└─────────────────────────────────────────────────┘
                         ⇩
┌─────────────────────────────────────────────────┐
│ measure the total volume of breastmilk produced into the │
│ storage vessel 1416 and divide by the amount of time │
│ spent pumping;                                  │
└─────────────────────────────────────────────────┘
                         ⇩
┌─────────────────────────────────────────────────┐
│ thereby producing an average maternal lactation flow │
│ rate.                                           │
└─────────────────────────────────────────────────┘
```

FIG. 7

SYSTEM AND METHOD FOR GENERATING NIPPLE PROTOTYPES

BACKGROUND OF THE INVENTION

The premature cessation of breastfeeding across the world is an issue that causes an estimated 820,000 deaths in children under the age of five and costs countries more than $300 billion annually. It's estimated that mothers should try to breastfeed for up to two years, however, most mothers stop nursing around six months. Over $17 billion U.S. economic savings could be achieved each year in medical costs and in the costs associated with women and children dying prematurely if 90 percent of babies were breastfed exclusively for the first six months of life.

A primary challenge that mothers face when breastfeeding is called "nipple confusion", which occurs after introduction of a bottle nipple. When the shape and flow rate of that bottle nipple does not naturally match that of a mother's, this causes frustration and confusion in babies. This problem prevented infants from "latching" back to their mothers breast (continuing to breast-feed) because the flow rate of the standard bottle nipple is usually much faster than that of the natural breast.

The continuity of breastfeeding is particularly important in preterm infants—an especially vulnerable population suffering from fatalities correlated with insufficient volumes of breast milk. For example, dysbiosis is the imbalance of gut microbe populations that are associated with virulence (proteobacterial dominance), inflammation, and immune disruption and is a precursor to necrotizing enterocolitis (NEC) and sepsis. All of these are bad. While overall incidence of NEC has decreased, largely due to increased human milk feeding of preterm infants, reduction of the mortality and economic burden of NEC still has not improved. NEC remains a devastating gastrointestinal disease affecting >4000 preterm infants yearly with a mortality rate of nearly 33%, and costs the U.S. healthcare system >$1 billion annually alone.

It is believed that the strongest known modifiable factor preventing dysbiosis is the increased volume of human breast milk intake. Dysbiosis is the precursor to NEC and sepsis. Even when preterm infants escape the fatal consequences associated with insufficient breast milk intake, chronic dysbiosis continues to affect health outcomes later on in life leading to atopy, systemic autoimmune diseases, allergies, and neurodevelopmental disorders.

Even in infants without NEC or sepsis, increasing intake of breast milk is positively correlated with robust cardio-pulmonary health later in life, along with improved neurodevelopment. Regarding infants born less than 30 weeks gestation, predominant breast milk feeds within the first month of life is also associated with a greater volume of deep gray matter volume at term along with higher IQ, working memory, academic achievement, and motor function at seven years of age in.

Evidence suggests preterm infant health is improved when discharged from a hospital's Neonatal Intensive Care Unit (NICU) is not delayed, therefore achievement of full oral feeds that are both safe and efficient is imperative. Independent oral feeding is a requirement for discharge home, and often, this may be the last milestone the infant met prior to discharge.

Most importantly, rapid discharge can be achieved by supplementing infants with expressed breast milk via a bottle while breastfeeding is being established, and this strategy is commonly employed in many units due to infant health, availability of the mother to breastfeed, and economic constraints. With today's working mothers, a suitable compromise is needed.

It is projected that increasing rates of breastfeeding could save the lives of more than 820,000 children under age five, annually, prevent 20,000 breast cancer deaths, and save $300 billion annually in health care costs worldwide. In addition, breastfeeding is associated with an IQ increase of 3 to 4 points. Despite all this only 40 percent of children younger than six months are exclusively breastfed.

Speech-language pathologists, while assessing the feeding in infants who are hospitalized, have also identify the demand for more suitable bottle nipples when feeding infants. The variability of bottle nipples can be a huge barrier to infants "latching" (returning to accepting the mother's breast milk) as most bottle flow rates are constant and less dynamic than a typical human breast. Average milk transfer from breast is said to occur at 2.2 mL/min. This is concerning when contrasted to a recent study of commercially available bottle nipples supplied in U.S. NICU's, where results ranged from 2.10-85.34 mL/min, with the majority of nipples providing a flow rate >10 mL/min. The aforementioned, un-naturally fast flow rate of bottle nipples is not only a concern in the NICU for risk of aspiration, but after discharge, it presents as a barrier to breastfeeding. Because infants admitted to the NICU are often primarily introduced to a bottle nipple, designing a bottle nipple that reflects lactating mothers' flow rates is imperative in preventing future barriers to breastfeeding.

Consequently, a goal of the embodiments disclosed herein is to help enable new, lactating mothers to overcome the barriers they face so they can continue breastfeeding for the recommended minimum of 2 years.

SUMMARY OF THE INVENTION

The embodiments herein integrate the process of 3D scanning lactating women's breasts to generate an AutoCAD model of the maternal nipple. The 3D scanning and generation of a plurality of maternal nipple shapes (in an embodiment, e.g. four) for creation of breastfeeding accessories and molds is intended to closely mimic a specific mother's unique nipple shape, which can vary widely from one woman to another. The intent is eliminating nipple confusion in infants being introduced to a bottle nipple and pacifier, in order to promote prolonged breastfeeding. Mimicking a mother's unique nipple shape helps create accessories that better fit a mother's unique nipple size and shape and decrease pain (i.e. pump flange and nipple shield). Nursing babies may not have teeth, but they can have rough gums, and their pressure can cause a bit of roughness on the surface of the nipple, discomfort if not outright pain. A nipple shield, properly manufactured and fitted, can help reduce this, and help prolong the time where the infant is nursing beyond the typical six months.

Novel features include but are not limited to properly representing maternal nipple shapes, and creating silicone bottle nipple types with calibrated progressive flow rate stages that match a specific maternal flow rate. Such embodiments could be used by e.g. doctors, home owners, businesses, etc. including breastfeeding mothers, hospital supply, and preterm infants—e.g. 2 years of age.

Breastfeeding products that mimic mothers' natural nipple uniquely are designed to promote breast feeding and skin to skin contact by improving latching. This is accomplished by providing continuity between the nipple used on the bottle and pacifier during infant's stay in the Neonatal Intensive Care Unit (NICU) or while the mother is at work and away from the infant, so that when the mother is able to breastfeed directly, the infant recognizes her individual nipple and does not reject her breast.

Products that provide continuity between bottle and breast, reducing latching problems, and promoting breastfeeding, can have a significant impact on mothers and babies. The market of breastfeeding mothers reaches four million women in the U.S. The immense significance of prolonged breastfeeding impacts not just clinical outcomes of the baby, but the health of the mother, and the global economy as a whole.

BRIEF DESCRIPTION OF THE DRAWINGS

FIG. 5 shows a plurality of representative nipple sizes/shapes;

FIG. 7 shows a flowchart for determining an average maternal lactation flow rate;

DETAILED DESCRIPTION OF THE PREFERRED EMBODIMENTS

The embodiments herein match the shape and flow rate of a mother which allow them to prolong breastfeeding past the customary periods of drop-off, e.g. 6 months, and also to prolong the bottle/breast dual-feedings stage. Prolonged breastfeeding and skin to skin contact enables breastmilk to continually act in establishing immunity, enabling protective neurological development, and genetic optimization through microbiome establishment.

Novel features of the embodiments of bottle nipples described herein can include, but are not limited to, being representative of maternal nipple shapes, in that mothers can pick which nipple is most similar to their own to prevent nipple confusion and the resultant latching problems.

Additionally, silicone bottle nipple types with progressive flow rate stages are built to match maternal flow rate, and prevents nipple confusion due to from flow rate variability between breastfeeding and bottle feeding by matching maternal lactation flow rate stages. These stages might encompass e.g. preterm, birth, 3 month, 6 months, 9 months, 12 months, 15 months, 18 months, 21 months, and 24 months postpartum.

Method of Manufacture

Figure 1:
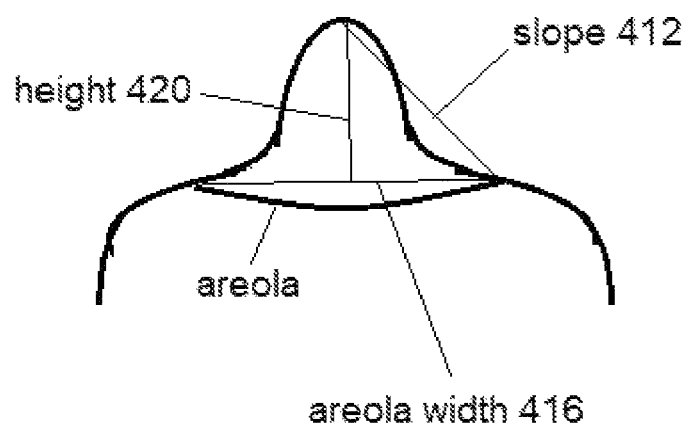
FIG. 1 shows some features present in all nipples.

FIG. 1 shows a representation of a human nipple, in which the specific elements nipple slope 412, areola width 416, and nipple height 420 are shown. These factors are chosen for their easy illustration, but the embodiments and measurements discussed herein are not limited solely to these features.

The following method steps are included for example only, and are non-limiting. The intent is to give an overview, with some specifics, on how to manufacture the embodiments herein, how to quality-test and improve their effectiveness, and how to get the mothers to best understand and make best use of the embodiments.

STEP 1 The embodiments herein integrate the process of 3D scanning lactating women's breasts to generate an AutoCAD model of the maternal nipple (where that mother is currently lactating).

Figure 2:
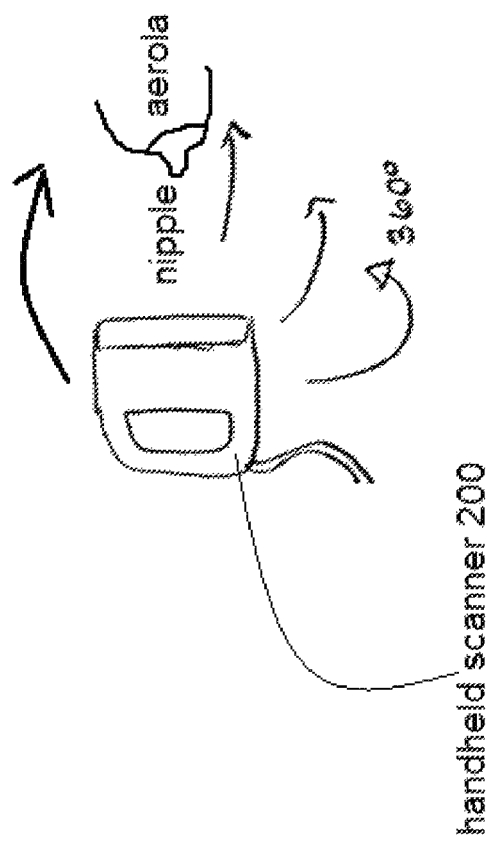
FIG. 2 shows an example arrangement of a scanning device taking images of a specific nipple
Figure 3:
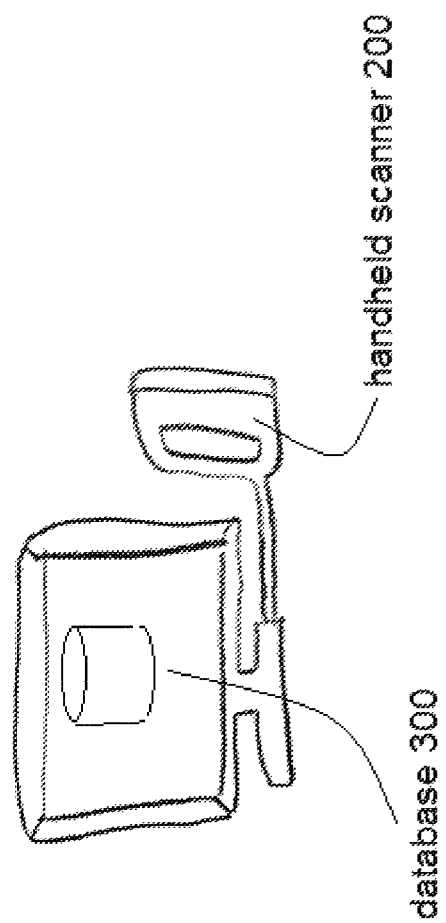
FIG. 3 shows creation of a database of 3D scans of a large number (e.g. >270) unique nipple sizes.
Figure 4:
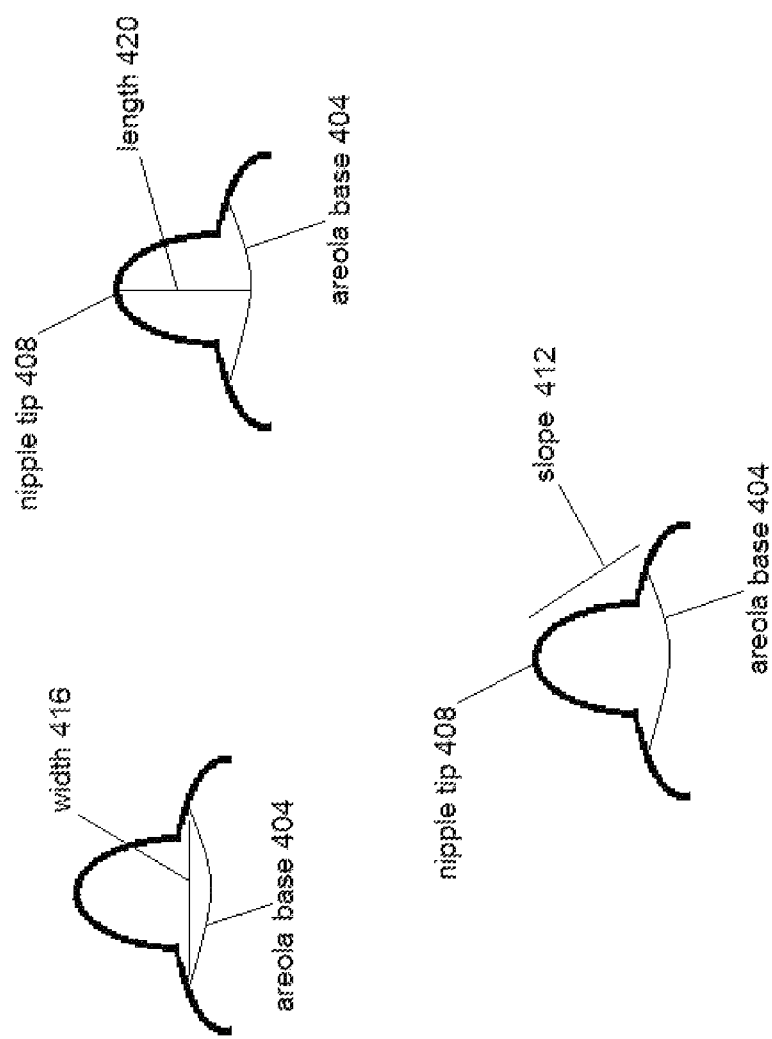
FIG. 4 shows examples of nipple height, slope, and width, and how to measure these.

STEP 2 To 3D scan a lactating breast, it is important that the nipple be reproduced during a "usable-lactating" state. Accordingly, the mother must be first engaged in breastfeeding for one full minute. After the one-minute wait, a person using a handheld 3D scanner selects 'small object' specification for scanning objects less than 16 inches in size. As shown in FIG. 2, Holding the 3D scanner 12-15 inches away from the profile view of the entire exposed breast and with the nipple in clear view, the holder of the scanning device slowly moves the 3D scanner closer and encircling 360 degrees around the entire nipple. In an embodiment, an Afinia 3D scanner is used to 3D-scan the mothers lactating breasts, although a variety of other 3D scanner/phone apps could be used. It is important that the scanning device have the ability to generate the right types of STL files, or other formats, that lend themselves well to 3D printing. It is also possible to perform conversion of the scanned files from some other format into the necessary STL format.

STEP 3 A next step would be to create a database of 3D scans of a large number (e.g. >270) of unique maternal breasts. This database is used to design a plurality of broad nipple categories representative of a much larger sample of sub-categories. There are certainly more than four nipple types in the world. To determine the average nipples types, the 3D scans from the plurality of mothers (e.g. 270) are saved in a stereolithography (STL) file format, and then imported into AutoCAD where a total of e.g. 40 (4 base categories×the 10 time periods) designs are made using a proprietary algorithm.

STEP 4 At this point, it is suitable to measure a slope and nipple length from areola base 404 to nipple tip in each of the nipple 3D scans, thereby giving rise to a range of minimum to maximum slope and nipple length. Measuring nipple width from one point of nipple base to 180 degrees opposite point of nipple base in each of the 3D scans, and then documenting a range of minimum to maximum.

STEP 5 Calculating the average slope 412 from the sample of 3D scans from each nipple tip 408 to areola base 404.

STEP 6 Calculating the average areola width 416 by measuring from one point on the nipple base (areola) to 180 degrees opposite across the nipple base in each of the breast 3D scans, and then dividing the average by the total sample size of breast scans.

STEP 7 Calculating the average nipple height 420 from the nipple tip 408 to the areola edge in each of the 3D scans and dividing by the total sample size of breast scans.

Figure 8:
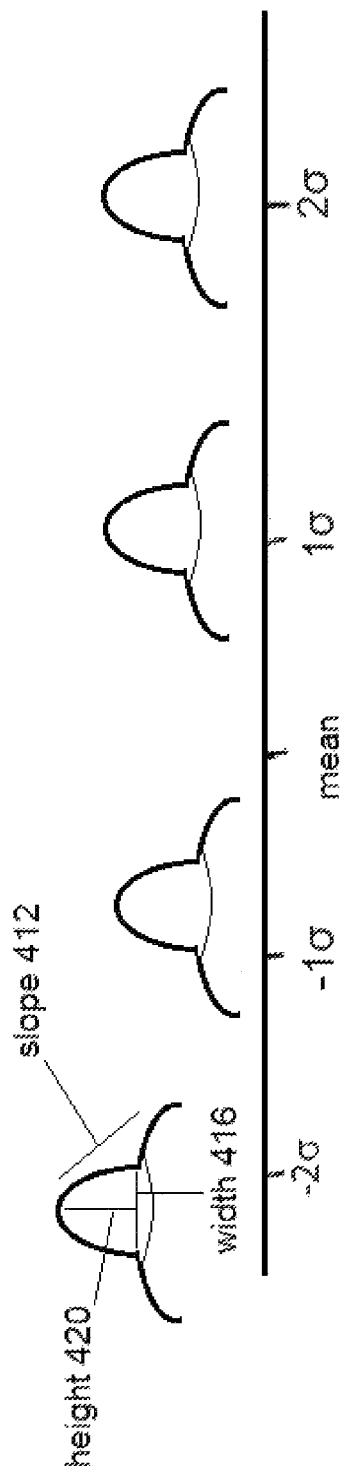
FIG. 8 shows some possible steps in generating a nipple shape algorithm.

STEP 8 Now that the above calculations are complete, the next step is to generate a nipple shape algorithm. An outline of these steps is shown in FIG. 8, but the following is a summary:

determining a minimum-maximum range from the areola base 404 to the nipple tip 408, determining a minimum-maximum range of width 416 of the areola, and determining a minimum-maximum range of nipple height 420; and then calculating two standard deviations (symbolized by the (lower case) Greek letter sigma σ) from the mean determined and adjusted for using normal distribution from upper and lower limits of the various ranges, thereby generating suitable dimensions for e.g. four representative nipple types. In an embodiment, the four representative nipple types correspond with −2σ, −1σ, 1σ, and 2σ deviations. However, the embodiments herein are not restricted to just four representative nipples types, nor are the embodiments limited to −2σ, −1σ, 1σ, and 2σ deviations.

Further, the statistical data discussed herein has explicitly described nipple height, nipple slope, and areola width. However, other dimensions may also be factored in, such as width of the nipple tip itself (different from width of the areola), and potentially other factor. Any nipple characteristic that can be photographed, scanned, or measured in some way, and then can be 3D printed or generated by some other means, can be a measurement factor within the embodiments discussed herein.

Next, as will be discussed in more detail later, the number of representative nipples types is sometimes discussed as being four, but this number is not fixed. Many other numbers may also be used, depending on expense and manufacturing efficiency. A key principle of the embodiments herein is to give an end-user and purchaser a choice that best matches her own nipple.

It is also possible to document dimensions of a sample of actual breasts using non 3D-scanning mechanisms, such as mechanical devices. A non-limiting list could include creating of an actual mechanical mold using imprinting the breast in clay or a polymeric material, also mechanical measurement using calipers, or measuring tape. In an embodiment, another way might be to use a measuring app on the mobile phone to generate the slope, length, and width dimensions.

Figure 9:
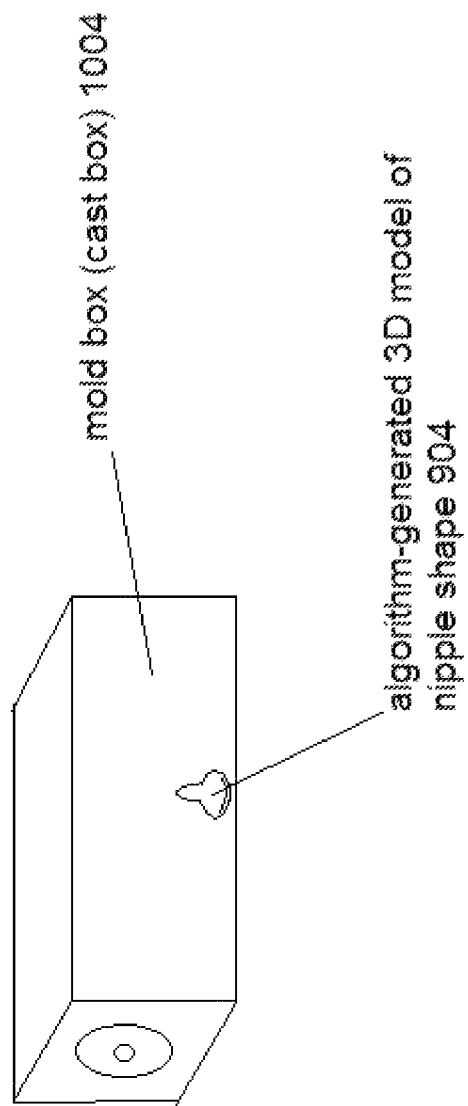
FIG. 9 shows a potential nipple shape.

STEP 9 At this point, a 3D printing algorithm generates a plurality of nipple shapes 904 (e.g. 4 representative shapes) in the form of CAD designs. An outline of such an arrangement in shown in FIG. 9, in which a 3D generated nipple shape 904 is shown inside of a mold box 1004. These CAD designs are then used to create a plurality of PDMS molds that represent the shape of mother's unique nipple types, in order to more accurately test the fluid dynamics expertise and match the flow rate of bottle nipples to that of actual breastfeeding. The generated dimensions of nipple types (adjusted two standard deviations above and below nipple sample slope, width, and height average) and CAD designs are intended for mold creation for breastfeeding accessory products. These products can include but are not limited to bottle nipples yes, as discussed, but also, pacifiers, breastfeeding pump flanges, sippy cups, and nipple shields.

The 3D shapes 904 can be printed in PLA (polylactic acid), titanium, stainless steel, nickel titanium, bronze, alumide, ceramic, or carbon fibers. The 3D printing algorithm generates 4 shapes rendering offset files having a nipple wall thickness ranging from 0.05--2 mm.

Figure 6A:
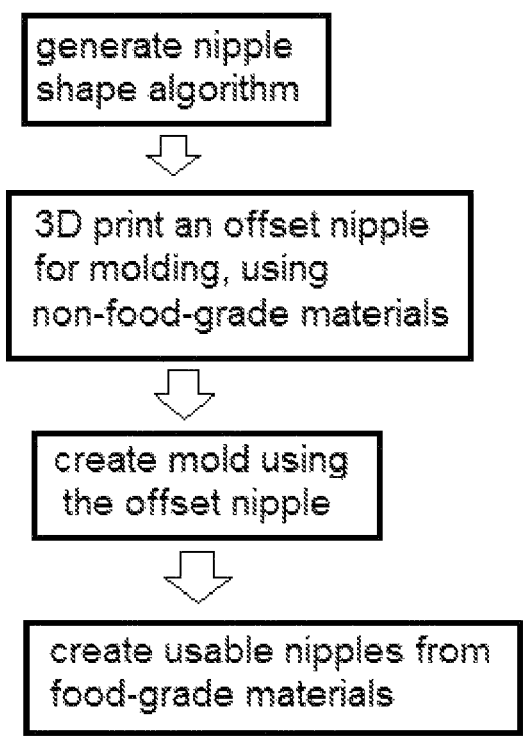
FIGS. 6A and 6B show alternating methods for creating nipple prototypes.
Figure 6B:
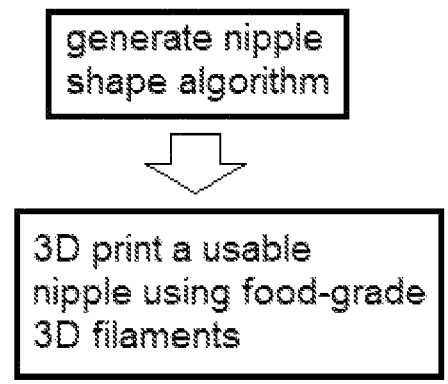

In an embodiment, the 3D shapes 904 are printed in PLA or the other materials described above. However, these materials are not food-grade nor suitable for being used in packaging of food products. Consequently, as shown in STEP 10 and below, the 3D shapes are printed for the purpose of then creating a PDMS mold. However, in the event that 3D printers become able to directly print food-grade food-usable packaging materials, various of the steps below may be reduced. This difference is diagrammed in FIGS. 6A and 6B.

STEP 10 The next step is casting the PDMS mold. Specifically, the nipple type models will then be used to produce a silicone nipple by 3D printing a mold from PDMS (polydimethylsiloxane, AKA silicone). This in turn results in a bottle nipple prototype that accurately represent mother's unique nipple type, which is crucial in matching the nipples of the embodiments herein with flow rate of the mother.

Figure 10:
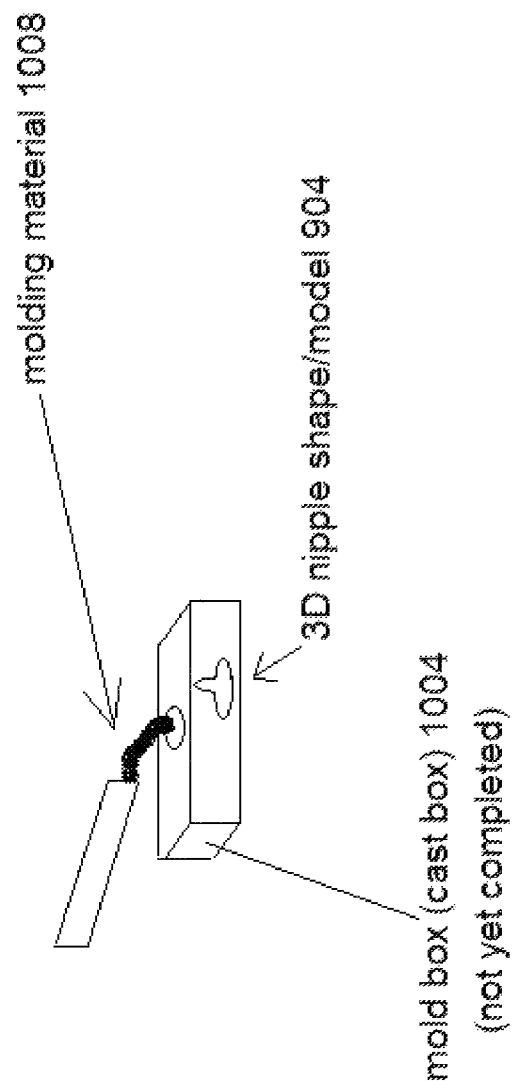
FIG. 10 shows the creation of a PDMS mold.

To achieve this, as shown in FIG. 10, it is necessary to start with a cast box (mold box) 1004. First, one of the 3D shape/models 904 is placed inside the mold box 1004. Next, the mold box 1004 is filled with a molding material 1008 such as e.g. silicone polymer. Instead of silicone polymer, urethane rubber, plastics, and foams could be used for the molding material 1008.

Figure 11:
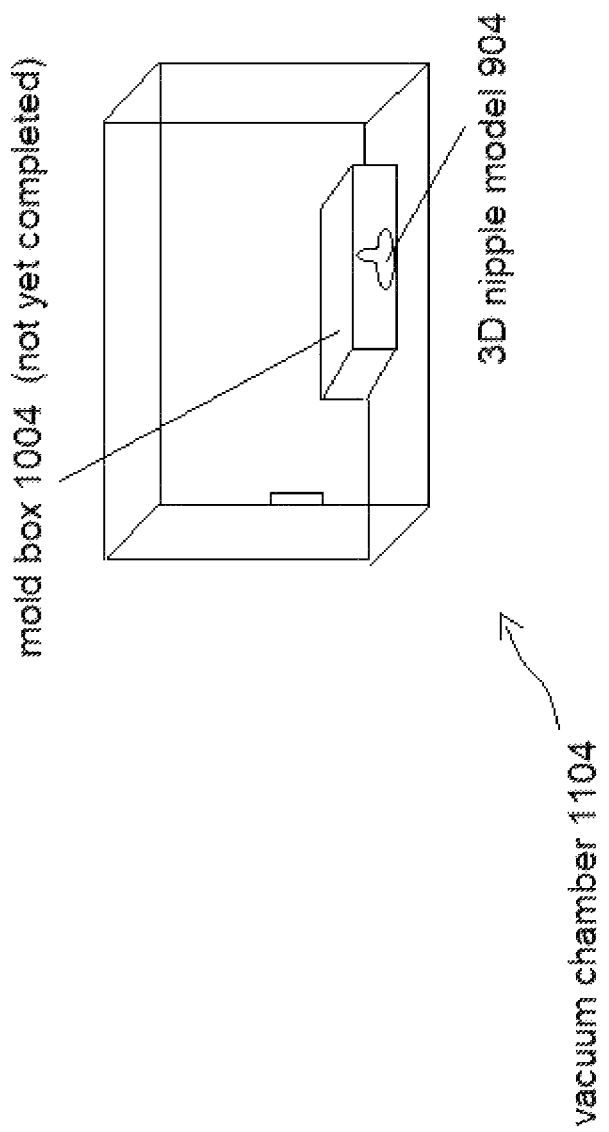
FIG. 11 shows a system for curing a mold box.

STEP 11 At this time, it is necessary to cure the mold box 1004, as shown in FIG. 11. Specifically, the cast box (mold box) 1004 that has been filled with the molding material 1008 and 3D printed model 904 is placed into a vacuum chamber 1104 to cure for a predetermined period (e.g. >23 hours). The vacuum chamber 1104 will be set to a predetermined pressure, e.g. 20-100 PSI. If the molding material 1008 is a urethane rubber, plastic, silicone rubber, or latex, then the mold box 1004 is stored at 65-80 degrees Fahrenheit.

Figure 12:
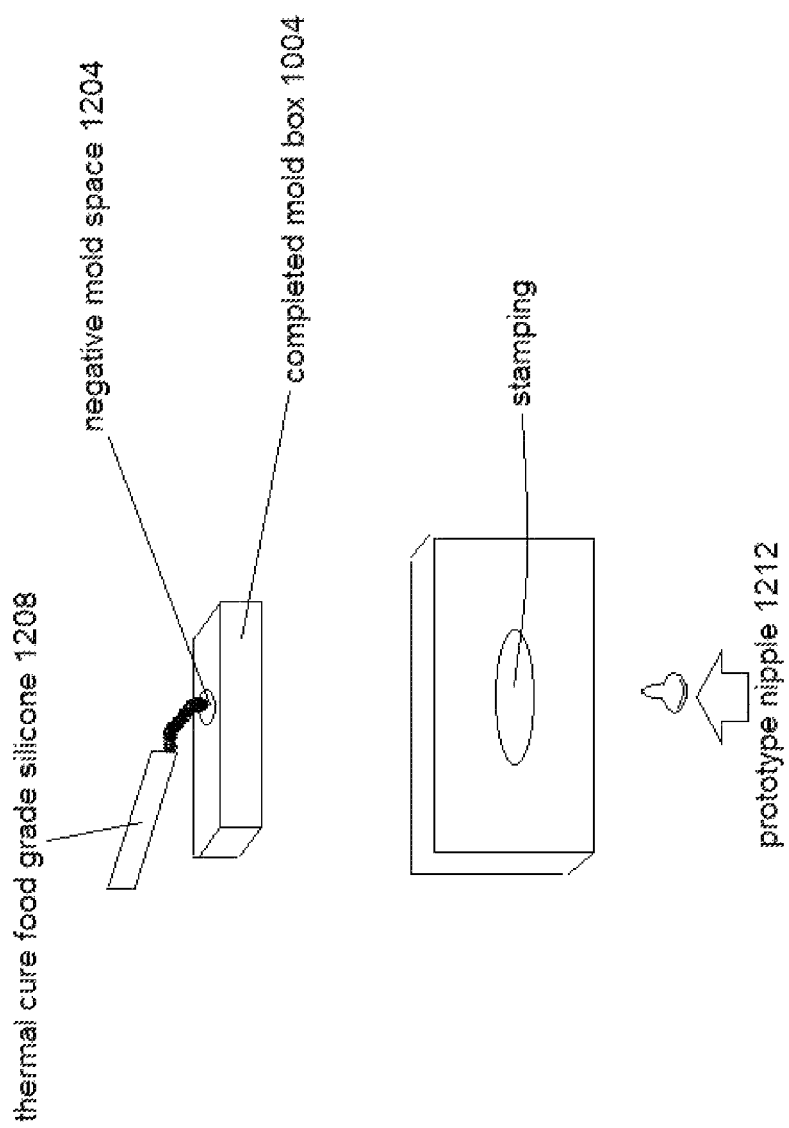
FIG. 12 shows the steps and equipment in creating a prototype nipple.
Figure 13A:
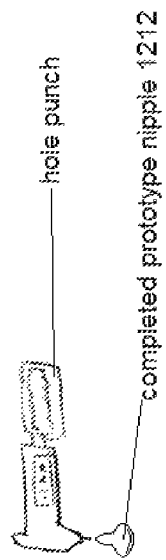
FIGS. 13A, 13B, 13C, and 13D show various techniques for creating lumen in a prototype nipple.
Figure 13B:
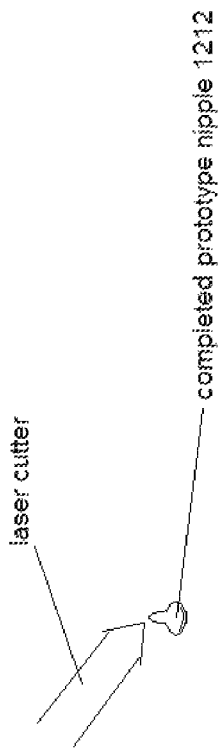
Figure 13C:
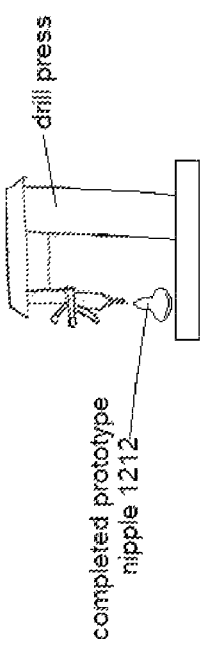
Figure 13D:
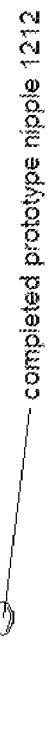

STEP 12 At this point, the mold box 1004 is ready. Accordingly, it is now possible to begin prototype-production for flow rate testing. This starts with a completed mold box 1004, and filling a negative mold space 1204 within that box with thermal cure food grade silicone (polymer melt) 1208, as shown in FIG. 12.

The process shown in FIG. 12 can be described as follows. Melt a plurality of polymer pellets until they are liquified and malleable. In an embodiment, a suitable temperature for liquefaction might be 320-480F, although this is for example-only and should not be considered limiting. Then, fill the negative mold space 1204 with polymer melt 1208 using pressurized injection. In an embodiment, the specific pressures for achieving this might range from e.g. 300-700 PSI although this is for example-only and should not be considered limiting.

At this point, a prototype nipple 1212 contained within the negative mold space 1204 is close to completion. A next and final step is to stamp that nipple 1212 to be 0.5 mm-2 mm smaller than the negative mold space 1204.

STEP 13 It is now possible to do lumen drilling, punching, or cutting of the silicone polymer prototype nipple 1212. Various mechanical techniques (molding, hole punching (FIG. 13B), mechanical drilling (FIG. 13C) used in the 40 prototypes (4 base models×10 time-periods) are shown in FIGS. 13A, 13B, 13C, and 13D. The purpose is creating bottle nipple lumen that reflects the specified flow rate from previously-obtained maternal data gathered using the methods described herein.

The arrangement of FIG. 13 can be described as follows. After cooling, removing the silicone polymer prototype nipple 1212 from mold box 1004. Next, punching of lumen is performed. This can be achieved by laser cutting (FIG. 13D), hole punching, mechanical drilling (FIG. 13C), or some combination of these. Specific types of laser cutting can include, but is not limited to: singleshot, percussion, trepanning, and helical.

Figure 14A:
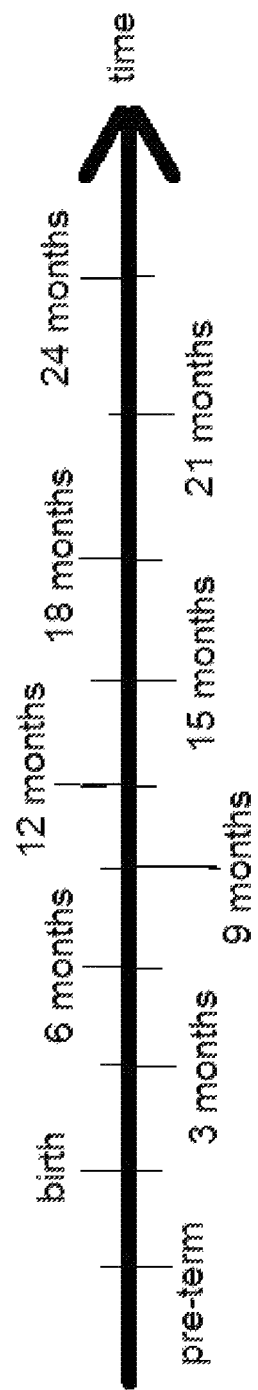
FIG. 14A shows an embodiment of flow rate testing, over a specific timeline.

STEP 14 Now that the prototype nipples 1212 are ready, the next step is flow rate testing. As shown in FIG. 14A, one part of this is gathering average maternal lactation flow rate data over her first two years of breastfeeding.

Figure 14B:
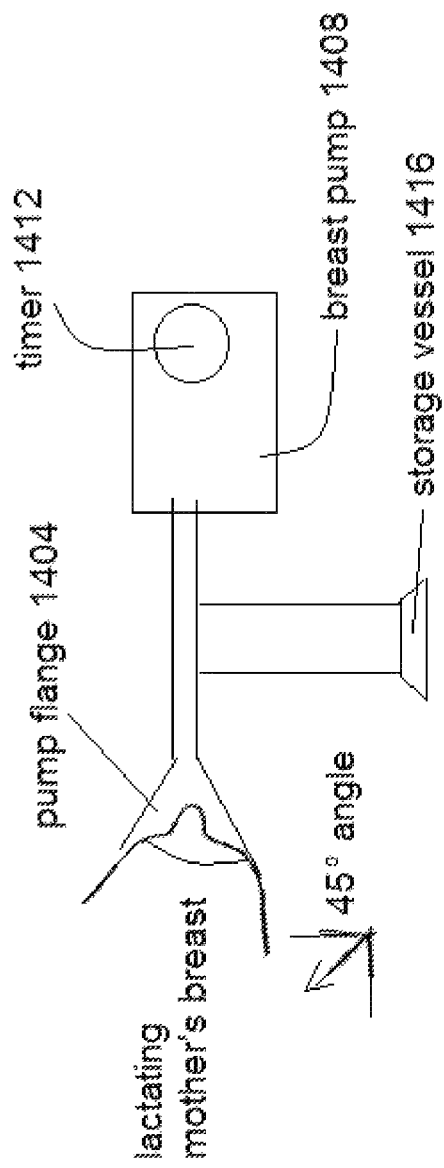
FIG. 14B shows details of the process of obtaining and calculating maternal lactation flow rate.

FIG. 14B shows details of the process of calculating maternal lactation flow rate, and FIG. 7 shows a flowchart detailing the steps. First, secure the lactating mother's breast to the pump flange 1404 at a 45 degree angle from horizontal. Then, set the timer 1412 and begin producing breastmilk by setting the negative pressure setting on the breast pump 1408 from 0-450 mm/hg. Pump the breastmilk into the storage vessel 1416, which is marked in milliliters. At this point, calculate the total volume of breastmilk produced into the storage vessel 1416 and divide by the amount of time spent pumping. This can be used to compute an averaging maternal lactation flow rate.

Data collection is achieved by tracking the breastmilk pumped by 30 breastfeeding mothers at each time point to be represented by bottle nipple flow rate: birth, 3 month, 6 months, 9 months, 12 months, 15 months, 18 months, 21 months, and 24 months postpartum is collected using e.g. a platinum Multi Use Hospital Pump by Ameda (or any other breast pump) and the mothers will breast pump for five minutes. Milk flow rate is calculated by taking the total volume in mL and dividing it by five minutes. After all of the mother's milk flow rates have been calculated, the average milk flow rate of the 30 mothers in mL/min is calculated for each time frame. This will serve as the flow rate for the bottle nipples during birth, 3 months, 6 months and the other time periods discussed herein.

STEP 15 Fluid dynamics calculations are then conducted to determine the flow rate that best matches the maternal flow rate data collected over the first two years of breastfeeding.

Figure 15:
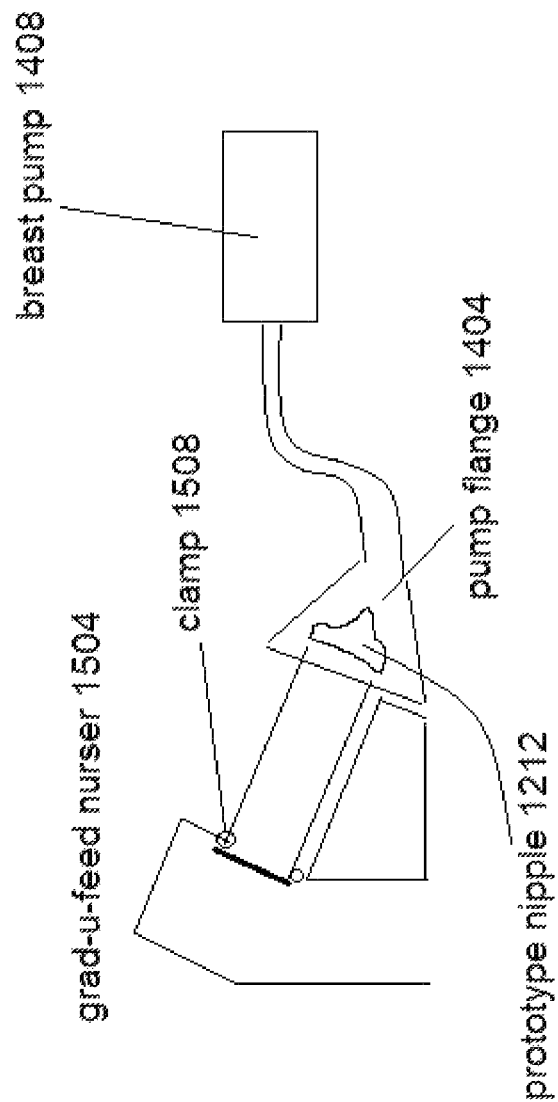
FIG. 15 shows an example outline of a standardized and controlled testing method.

FIG. 15 shows an example outline of a standardized and controlled testing method is used to compare flow rates between nipple types, and is intended to test nipples under standardized conditions that mimic milk flow rates achieved by an infant during oral feeding.

Specifically, in an embodiment, a 60-mL bottle will be used to test all nipples (to ensure testing-consistency, the same-sized bottle should always be used). Next, a specific ready-to-feed formula will be used for all tests. A non-limiting example might be Similac Advance Stage 1 (20 calories/oz). The formula will be changed every 10 tests to maintain consistency in the testing methods and to ensure that formula was not tested after being open for 30 minutes. This is a conservative approach, given the manufacturer's recommendation to use within 1 hour of opening. FIG. 15 shows how the grad-u-feed nurser 1504 and clamp 1508 maintains a 2.5-cm height from the level of the liquid surface to the tip of the nipple. These items achieve approximately equal levels of hydrostatic pressure all test environments.

Volumetric flow rate can be, for example, a function of the diameter of the nipple tip, the thickness of the silicone and the density of the media, which are subsequently adjusted for each of the 4 nipple shape dimensions referred to earlier. These adjustments strive to match with maternal lactation flow rate averages at the ten stages discussed earlier (repeated here for convenience): preterm, birth, 3 month, 6 months, 9 months, 12 months, 15 months, 18 months, 21 months, and 24 months postpartum.

For the embodiments herein to achieve the best end-user satisfaction (where "end user" includes both mother, child, and hospital/clinic using the embodiments) in which the nipple prototype 1212 matches the natural flow rate of the mother, it is necessary to conduct fluid dynamics calculations to determine the flow rate through the embodiments that matches the maternal flow rate data collected over the first two years of breastfeeding. Volumetric flow rate is a function of multitude of factors, but the embodiments herein focus on the diameter of the nipple tip, and a thickness and density of the silicone. To the extent the flow rate of the nipple prototype 1212 does not match the natural flow rate of the mother, various or all of the steps 8-13 can be repeated.

Prototypes

In an embodiment, 40 prototype nipples are utilizing varying silicone manufacturing techniques to determine which best prototypes best represent density to maternal breast tissue. The specific number 40 is chosen based in the 4 basic nipple categories (remembering there can be a large number of sub-categories) multiplied times the 10 time-periods discussed herein, that is, pre-birth, birth, 3 month, 6 months, 9 months, 12 months, 15 months, 18 months, 21 months, and 24 months postpartum. These 40 prototype nipples are then tested to identify whether the flow rates are similar to lactating mothers with preterm infants amongst the varying nipple types. The mold for the prototypes will be printed using polydimethylsiloxane (PDMS) material, AKA silicon. A power analysis will be conducted to compare flow between nipple types with 80% power at an alpha of 0.05. Alpha is the probability of rejecting the null hypothesis when it is true. For example, a significance level of 0.05 indicates a 5% risk of concluding that a difference exists when there is no actual difference. In an embodiment, 4 representative nipple types are generated, and are then tested in an on-going fashion to achieve increasing flow rate from birth, 3 month, 6 months, 9 months, 12 months, 15 months, 18 months, 21 months, to 24 months postpartum.

The bottle nipple will be contained in a vacuum-like apparatus and would be attached to a breast pump e.g. a Platinum Multi Use Hospital Pump by Ameda®, in order to determine the measurement of milk flow rates, calculated in millimeters per minute. The bottle nipples will be placed in a flange at a 45-degree angle to assure appropriate suctioning and to mimic the proper positioning of bottle feeding. Formula milk will be advanced through the bottle utilizing the negative and positive pressure applied by the breast pump. The breast pump suction can be set at e.g. 150 mm Hg for the bottle nipples to mimic the natural intra-oral vacuum of a typical infant. The formula milk will then be collected in a measurable container for a predetermined time period, e.g. 5 minutes. After gathering data on all 36 prototype nipples, the milk flow rate average in milliliters per minute can then be calculated.

To calculate the flow rate average, first, calculate the average of ml/min for each nipple by taking the total of mL and dividing that number by five (total mL/5=mL/min). After calculating the bottle nipples individually, an average of all bottle nipples can then be determined. This will be compared to the lactating mothers milk flow rate, to determine whether the embodiments herein truly represent that rate of lactating mothers during each time period.

Method of Use and Retailing

It is possible to examine the flow rates of commercially available bottle nipples that are used in hospitalized infants. Utilizing a breast pump, it is possible to measure the amount of formula expressed in one minute across the different bottle nipple manufacturers, and also compare the nipples within three categories: slow, standard, and premature (too fast). As a result, it has been found that nipple flow rates range from 2.10--85.35 mL/min. This is a wide range, thus there is a significant difference amongst the nipples. For example, the four nipples categorized as Premature showed significantly different flow rates ($p<0.05$), ranging from 3.39 to 22.68 mL/min. Too fast of a flow rate is bad, as the baby may be used to it and not go back to the mother's slower rate. However, too slow is also bad, as the baby might not get properly fed.

Branding Strategy

The embodiments herein will be advertised as a bottle nipple with a close representation to the mothers' natural shape and flow rate. Some mothers will have to introduce the bottle at some point due to any/all of the baby's prematurity, her work obligations, and\or having multiple babies. When bottle feeding becomes inevitable, the embodiments herein will incorporate customer outreach mechanisms to assist users in alternating between breastfeeding and bottle feedings.

Additional embodiments will include cultivating a group of influencers for marketing by actively direct messaging followers on social media channels. Also, social media will be used as an engagement platform, including conducting "live" sessions on e.g. Instagram or other platform to ask questions and be interactive with the audience.

An emphasis will be on a minimal aesthetic product that assists mothers with bonding. Marketing will target, among others, millennial working mothers who want to spend time with their newborn after work and continue to breastfeed. Embodiments herein offer a solution that allow babies to latch back onto moms without difficulty. It is also a planned aspect of the embodiments herein to ramp up production slowly to be able to quickly attain feedback directly from our consumers in order to make any adjustments to the product, while maintaining the highest possible margins per unit early on.

After sufficient initial data is collected on nipple sizes from lactating mothers, a number of representative nipple sizes/shapes will be chosen. FIG. 5 shows an example of 4 representative nipple sizes/shapes that may be sold to end-users. Within FIG. 5, the specific proportions are exaggerated in order to properly illustrate the differences in dimensions. FIG. 5 is not meant to be anatomically accurate. During initial product development, all participants will be carefully measured, likely with 3D scanning mechanisms. However, once the embodiments herein hit retail, it will not be possible to do so, so that a representative set of nipples will be made available in retail environments. It is always possible that a specific woman's dimensions may not closely match with any of the representative samples, but the intent is to find the center of the bell-curve distribution of nipple types, and thus accommodate as large a % of lactating mothers as is possible.

To achieve this, the lactating mother who is making a purchasing decision, and trying to decide which of the e.g. four representative nipple types is closest to her may do the following:

3D scanning her nipple ahead of time using a proprietary mobile application (not shown), and letting the proprietary mobile application steer her toward the most appropriate of the e.g. four representative nipple types;

measuring her own dimensions using e.g. mechanical calipers and measuring tape, and then self-selecting her best match of the four representative nipple types;

complete a short survey while present at the retail site providing several questions regarding picking a relative object that is most similar to her nipple dimensions, and then the receiving a recommendation of which of the e.g. four representative nipple types is best;

sight-testing, that is, while present in the retail store, look down her own shirt, to see which of the e.g. four off-the-shelf e.g. four representative nipple types matches her the best;

providing a 'starter pack' with all four shapes that lactating mothers can try out, compare, and experiment with.

Method of Use

Before using the embodiments herein for the first time, boil all pieces for 10 minutes to sterilize. Before each use place all parts in boiling water for 5 minutes, to ensure hygiene. Before using the embodiments herein for the first time, boil for 10 minutes to sterilize.

Do not use if cracked or torn or otherwise damaged. Never use as a soother/pacifier. Do not leave in direct sunlight or heat, or leave in disinfectant/sterilizing solution for longer than recommended, as this may weaken the nipple.

What is claimed is:

1. A method of prolonging an infant's capacity to breast feed, comprising:
    performing 3D scanning of a plurality of lactating women's breasts thereby generating a plurality of computer-generated models of a plurality of maternal nipples;
    storing the plurality of computer-generated models into a database;
    designing a plurality of nipple shapes based on the computer-generated models within the database;
    generating a 3D printing algorithm based on the plurality of nipple shapes;
    using the plurality of nipple shapes generated by the 3D printing algorithm, creating a plurality of polydimethylsiloxane (PDMS) molds;
    individually casting the plurality of PDMS molds into individual nipple prototypes;
    for each nipple shape, assembling a cast box;
    for each nipple shape, inserting a 3D printed nipple mold into the cast box;
    filling the mold box with silicone polymer so that the entire mold box is completely filled except for where the nipple mold is located;
    inserting the entire combination into a vacuum chamber;
    curing the entire combination for at least 23 hours;
    removing the 3D printed mold, thereby creating a negative mold space in the mold box, the negative mold space being suitable for generating a functioning nipple prototype;
    filling the negative mold space with thermally curable food grade silicone;
    melting polymer pellets until malleable and liquified;
    filling the negative mold space with polymer melt using pressurized injection at a predetermined pressure and for a predetermined time period, thereby creating a thermally cured nipple prototype; and
    stamping\molding the thermally cured nipple prototype to be 0.5 mm-2 mm smaller than the negative mold space.

2. The method of claim 1, further comprising:
    the step of performing 3D scanning further comprising using a handheld 3D scanner;
    selecting a small object specification on the handheld 3D scanner suitable for scanning objects less than 16 inches in size;

holding the 3D scanner 12-15 inches away from the profile view of the entire exposed breast; and once the nipple is in clear view, slowly moving the 3D scanner closer and encircling 360 degrees around the entire nipple.

3. The method of claim 1, the step of performing 3D scanning further comprising:

for each of the 3D scans, measuring a nipple width, slope, and height, and determining minimums and maximums for each, thereby creating a range for each;

the nipple height being measured from an areola base to a nipple tip;

the nipple width being measured from one point of nipple base to 180 degree opposite point of nipple base;

the nipple slope being measured from a center of the nipple tip to the edge of the areola; and determining an average nipple width, slope, and height.

4. The method of claim 3, the step of generating a 3D printing algorithm further comprising:

calculating two standard deviations from the average height, width, and slope, using normal distribution from upper and lower limits of the height, width, and slope ranges; and utilizing those distributions to generating dimensions for a plurality of representative nipple types.

5. The method of claim 1, further comprising:

creating bottle nipple lumen that reflects the specified flow rate from predetermined maternal data.

6. The method of claim 5, the step of creating lumen further comprising drilling.

7. The method of claim 5, the step of creating lumen further comprising punching.

8. The method of claim 5, the step of creating lumen further comprising cutting.

9. The method of claim 1, further comprising:

performing flow rate testing on a plurality of lactating mothers using breast pumps.

10. The method of claim 9, further comprising:

gathering average maternal lactation flow rate data at various points of time in the first two years of breast feeding;

calculating maternal lactation flow rate; and determining an average maternal lactation flow rate.

11. The method of claim 10, the step of gathering average maternal lactation flow rate data further comprising:

securing the lactating mother's breast to a pump flange at a predetermined angle from horizontal;

setting a timer and begin expressing breastmilk by setting a negative pressure setting on the pump to a predetermined setting;

calculating a total volume of breastmilk expressed and divide by the amount of time spent pumping.

12. The method of claim 10, the various points of time further comprising:

preterm, birth, 3 month, 6 months, 9 months, 12 months, 15 months, 18 months, 21 months, and 24 months postpartum.

13. The method of claim 1, further comprising:

testing a volumetric flow rate of each nipple prototype using a first proprietary test environment;

periodically testing a volumetric flow rate of the lactating mother corresponding to the nipple prototype using a second proprietary test environment;

comparing the two flow rates; and adjusting the nipple prototype to more accurately emulate the volumetric flow rate of the lactating mother.

14. The method of claim 13, the step of adjusting the nipple prototype further comprising making alterations to a diameter of a tip of the nipple prototype.

* * * * *